June 28, 1938.   J. S. DONNELLAN   2,122,055
SPRINKLER
Filed March 25, 1938
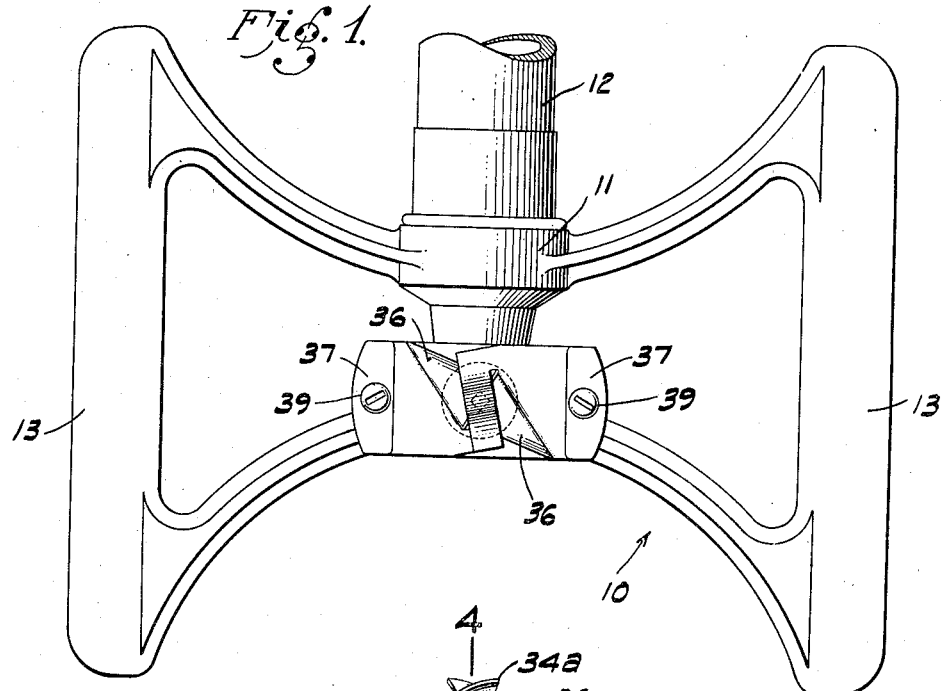
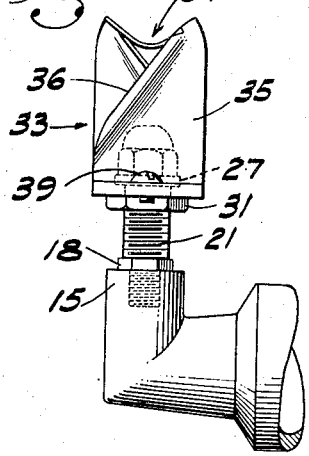
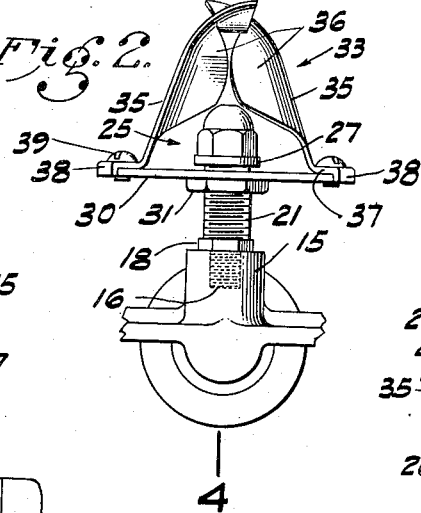
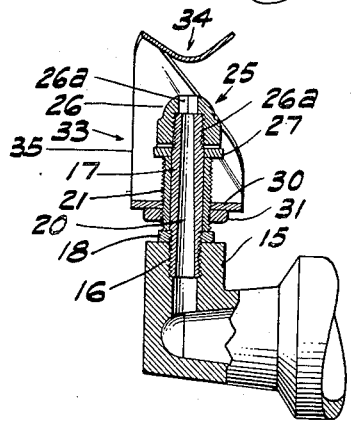
JAMES S. DONNELLAN, INVENTOR.
BY [signature] ATTORNEY.

Patented June 28, 1938

2,122,055

UNITED STATES PATENT OFFICE 2,122,055

SPRINKLER

James S. Donnellan, Los Angeles, Calif.

Application March 25, 1938, Serial No. 198,095

8 Claims. (Cl. 299—126)

This invention relates to a sprinkling device of the rotary type.

An object of the invention is to provide a sprinkler that will spray water upon the soil and lawn in such a manner that the benefits derived therefrom will closely simulate those derived from a drizzling rain. This object is attained by reason of the fact that a combined agitating effect and vacuum effect is produced upon the water as it is delivered from the rotating sprinkler head, whereby the water is aerated during the sprinkling operation in a manner similar to that which takes place when it falls through the atmosphere during a shower of rain.

Another object of the invention is to provide improved means for regulating the device so as to increase or diminish the amount of water output per unit of time without causing an undue extension of the area being sprinkled. Hence the device effectually safeguards against spray being thrown into the windows of dwellings adjoining the area being sprinkled, even when the device is so adjusted as to deliver the water upon a lawn or garden as rapidly as possible.

Among other objects of the invention are to provide an improved anti-friction means to reduce the friction caused by a rotating, spray-deflecting sprinkler head; to regulate the height of the spray in a more satisfactory manner; to provide a simplified, positive means for adjusting the deflectors carried by the rotary sprinkler head in their relation to the discharge end of the nozzle; to furnish a spray-distributing sprinkler head which will constitute a new and improved article of manufacture; and to, in general, lower cost of manufacture and simplify a device of the kind to which the invention pertains.

Other objects, advantages and features of invention will hereinafter appear.

Referring to the accompanying drawing, which illustrates what is at present deemed to be a preferred embodiment of the invention, which has been reduced to practice and is now being sold in the trade.

Fig. 1 is a top plan view of the device showing the same connected onto the discharge end of a garden hose.

Fig. 2 is a side elevation of the structure shown in Fig. 1, the side portions of the base being broken away in order to contract the view.

Fig. 3 is a side elevation looking toward the right hand side of the device as shown in Fig. 2.

Fig. 4 is a vertical section taken on line 4—4 of Fig. 2.

Fig. 5 is a bottom plan view of the nozzle cap nut separately shown.

Referring in detail to the drawing, the combined base and water supply member 10 has a hose end fitting 11 to receive the hose 12, and has at each side a foot portion 13 which is parallel to the axis of said fitting. Said base member is also furnished with an upwardly directed water delivery stem 15 having an internally screw-threaded outlet portion 16 into which is screwed the nozzle nipple 17.

As shown in Fig. 4 said nozzle nipple 17 is not externally screw-threaded its entire length, but its middle portion is smooth, and so far as its lower portion is concerned only enough thereof is screw-threaded to give it a secure footing within the stem 15, and also to receive a lock nut 18 whereby the nozzle is effectually safeguarded against accidental loosening. Said nozzle 17 is of a uniform outside diameter, except that its diameter is slightly reduced where the screw threads are formed therearound. The passage 20 thru said nozzle is shown tapered so as to decrease in cross sectional area as it approaches the discharge end.

Around the unthreaded portion of the nozzle 17 rotatably fits an externally screw-threaded sleeve 21, the lower end of said sleeve, under the action of gravity, resting upon the lock nut 18 when the water is turned off.

Onto the upper end of the nozzle 17 is screwed a polygonal nut 25 having a dome-shaped top portion 26. Said nut has a water discharge passage 26a through its dome portion which is square in cross section, the lower portion 25a of the passage thru said nut being circular, and threaded to screw onto the upper end of the nozzle 17. The upper end portion of the nozzle 17 is exteriorly threaded only a sufficient distance to provide for securely screwing said nut 25 thereonto. Between said nut and the sleeve 21 is interposed a washer 27 preferably constructed of bakelite, the exterior diameter of which is slightly greater than the average diameter of the polygonal portion of the nut, so as to entrap water flowing downwardly over the surface of the nut whence it is conducted therebetween by means presently to be described to lubricate the two contacting surfaces.

The water deflecting assembly includes a base plate 30 having a central screw-threaded aperture which is screwed onto the sleeve 21 in order that it may be adjusted to the desired point in regard to the length of said sleeve, for regulating the height of the spray. Beneath said base plate there is screwed onto said sleeve the upper lock nut 31 whereby said base plate, together with the parts carried thereby are maintained in the adjusted position with respect to the length of said sleeve 21, and is caused to rotate therewith.

Upon said base plate 30 is mounted a spray producing or water deflecting plate 33 which should be made of a strap of heavy sheet metal of a non-corrosive character. The strap of metal from which this deflector 33 is formed is transversely cut across the greater portion of its width from opposite side edges, a bridge strip 34 resulting across the top of the completed deflector. This bridge strip is saddle shaped and is symmetrically disposed so that it splits the portion of the stream of water which strikes against its lower side into two halves, one half being directed away from one side of said bridge strip and the other half away from the opposite side thereof. The ear-like deflector 34a which is found at each end of said bridge strip contributes to producing this result.

The two cuts which provide for the formation of said bridge also make it possible to deflect from each side portion 35 thereof an inwardly directed deflector wing 36. When the water strikes these wings it is thrown out in a spray at each side of the device, and at the same time a reaction takes place which causes the spraying assembly to rotate.

Each side plate 35 of the spraying assembly is inclined toward the other and is shown having its upper end integrally united with its fellow, thereby forming a deflecting structure of an inverted V shape. The base portion of each plate 35 is furnished with an outwardly deflected foot portion 37 which rests upon the end portion of the base plate 30 at that side of the structure, and which has a toe portion or downwardly directed end flange 38 which fits over the end edge of said base plate. This part of the structure is completed by the attaching screws 39 which extend through said feet and secure them to the base plate 30.

The bakelite washer 27 is interposed between the base of the dome shaped nut and the base plate 30.

Said washer, as stated, is of a slightly greater diameter than the average diameter of the polygonal portion of said nut and the nut is furnished with a basal, diametrical kerf 42 which aids in conducting drippage into the interior of the washer and also within the sleeve 21, thus lubricating the spray-deflecting assembly and providing for a minimum of rotational friction. The bakelite washer 27, when moistened, affords a superior anti-friction element.

Preparatory to putting the device into operation the lock nut 31 is screwed up or down to the desired place with respect to the length of the sleeve 21, and then the base plate 30 is screwed down into firm contact with the upper face of said nut. This being done properly, a fixed relation is established between the rotatable sleeve 21 and the remainder of the rotating stream-directing and stream-distributing assembly. When the spray distributing assembly is adjusted upwardly with relation to the sleeve 21 the height to which the water ascends is increased, and when said assembly is lowered the height to which the spray is thrown is decreased, but in either event the sprinkled area remains substantially the same.

When a water supply is furnished to the device under 70 pounds pressure per square inch such pressure is sufficient to drive the spray distributor at a speed of 2500 revolutions per minute. At this high speed air is entrapped in the water being sprayed and is conveyed with the water to the soil, thus distributing to the soil gaseous elements in the free state in air so essential to plant growth.

The first effect of turning on the water is to cause the entire rotary spray-deflecting assembly, including the sleeve 21, to slide upwardly on the nozzle nipple 17 till the upper end of said sleeve engages the lower face of the washer 27. The distance of the various deflectors above the top of the nozzle when this movement has taken place will depend upon the place in relation to the length of said sleeve to which the base plate 30 has been adjusted before locking it in place by the use of the nut 31.

When the water is first turned on the spray distributing assembly may not at first rotate freely, but the water which is thrown back over the dome shaped nut by the deflecting elements will soon flow inwardly thru the kerf over the bakelite washer 27 this action of the water being facilitated by reason of the fact that the diameter of said washer is somewhat greater than the diameter of the polygonal portion of the nut and is also facilitated by the passage afforded by the undercut or kerf 42 across the bottom of said nut, and as soon as the water has passed inwardly towards the nozzle nipple 17 and has moistened its exterior surface, free rotation of the entire rotatable assembly will take place.

The major portion of the stream of water which ascends from the nozzle tip afforded by the dome shaped nut 25 is laterally deflected by the two wing-like deflectors 36, and the remaining portion of the stream strikes against the downward convexity of the saddle or bridge 34 and is divided into two halves which are further deflected and atomized by engaging the ear-like deflectors 34a. The portions of the stream which are acted upon by the bridge 34 and its deflectors 34a are ejected from the device at approximately right angles to the portions of the stream which are acted upon by the main deflectors 36.

Owing to the fact that the upper or terminal portion 26a of the discharge passage, thru the nut dome 26 is square in transverse section a square effect is given to the distribution of the water so that, by giving the proper rotational position to the device upon the lawn or in a garden the corner portions of square plots will be sprinkled, without the water being thrown beyond their side and end edges. Opposite sides of this square passage are disposed parallel to the straight edged foot portions 13 of the support in order that the attendant may have no difficulty in determining how to position the device to make the square sprinkled area fit the corner portions of the ground area to be sprinkled.

It should be understood that the present disclosure is for the purpose of illustration only and that this invention includes all modifications and equivalents which fall within the scope of the subject matter claimed.

What is claimed is:

1. In a device of the kind described, in combination, a support, a nozzle member mounted on said support, a rotary stream deflecting assembly comprising a base plate rotatably mounted on said nozzle, and a deflector consisting of a strap of metal bent into an inverted V-shape and having the lower end portions of its limbs secured to said base plate with its apex portion substantially in axial alinement with the nozzle passage, each side edge portion of said strap metal having a wing positioned to deflect the stream toward the side of the strap opposite thereto.

2. The subject matter of claim 1 and, the apex portion of said strap being furnished with a wing at each side positioned to deflect a portion of the ascending stream laterally at approximately a right angle to direction in which it is deflected by the first recited wings.

3. In a device of the kind described, a nozzle nipple, means to support said nipple in an upstanding position and to supply water thereto, an exteriorly screw-threaded sleeve slidably and rotatably fitted upon said nipple, a deflector assembly having a base portion with a screw-threaded opening thru it to screw onto said sleeve, and a lock nut screwing onto said sleeve and abuttable against said base portion to fix said deflector assembly in its vertically adjusted position in relation to said sleeve, to vary the distance of the deflecting elements from the mouth of said nozzle.

4. In a device of the kind described, a base having a foot portion of a straight-edged character, an upstanding nozzle supported by said base, said nozzle having an outlet passage with a squared mouth portion, opposite sides of said squared mouth portion being substantially parallel to said foot portion, and rotary spray-deflecting means mounted with its spray-deflecting elements in the path of the stream issuing from said nozzle.

5. In a device of the kind described, a support, a nozzle supported thereby in an upwardly directed position, a stream deflecting assembly rotatably and slidably supported upon said nozzle, stop means carried by said nozzle to limit the upward sliding movement of said assembly caused by the impact of the stream thereagainst, and a bakelite washer positioned as an anti-friction element between said stop means and the adjacent portion of said assembly, said washer being positioned to be moistened from the stream issuing from said nozzle, said stop means having an undercut portion to admit the water to the adjacent face of said washer.

6. In a garden sprinkler or the like, a base having a connection for a hose nozzle, and a sprinkler head for delivering a fluid supplied by a hose thru the medium of said base, said sprinkler head comprising a nozzle carried by said base, a cap nut screwed to said nozzle, said nut having a discharge passage communicating with said nozzle passage, a lock nut for securing said nozzle to said base, an externally screw-threaded sleeve mounted on said nozzle with a workable fit, a washer interposed between said cap nut and said sleeve, a winged deflector having a base bar, said bar having through it a threaded aperture whereby it is adjustably mounted on said stem to regulate the height of the spray deflected by the wings of said deflector and a lock nut for maintaining the selected position of said cross bar on said sleeve.

7. As an article of manufacture, a spraying assembly capable of being rotatably mounted upon an upstanding nozzle, said assembly when so mounted comprising an upper and a lower pair of stream deflecting wings, wings of each pair being directed oppositely to each other, and the wings of one of said pairs being directed at approximately right angles to those of the other, all of said wings being deflected portions of a strap of metal of an inverted V-shape, said metal strap having two slits cut thereinto across the greater portion of its width from opposite side edges thereof adjacent to its mid-length, the slit portions of the metal defining outer edge portions of said wings.

8. In a device of the kind described, a nozzle, means to support said nozzle in an upstanding position, a spray deflecting assembly rotatably mounted upon said nozzle in the path of the stream therefrom, and a nozzle tip consisting of a nut having a squared mouth portion to direct a square stream of water against said spray deflecting assembly.

JAMES S. DONNELLAN.